United States Patent [19]

Barton, Jr. et al.

[11] 4,184,180

[45] Jan. 15, 1980

[54] FILE PROTECT AND AMOUNT OF TAPE SENSING APPARATUS

[75] Inventors: William M. Barton, Jr., San Diego; Martin D. Gray, La Jolla, both of Calif.

[73] Assignee: Cipher Data Products, Incorporated, San Diego, Calif.

[21] Appl. No.: 943,059

[22] Filed: Sep. 18, 1978

[51] Int. Cl.$^2$ .................... G11B 15/04; G11B 15/18
[52] U.S. Cl. .................................. 360/60; 360/72.1
[58] Field of Search .................. 360/60, 72, 74, 137

[56] References Cited

U.S. PATENT DOCUMENTS

| | | | |
|---|---|---|---|
| 3,688,300 | 8/1972 | Whysong et al. | 360/60 |
| 3,700,320 | 10/1972 | Brewer et al. | 360/72.1 |
| 3,772,662 | 11/1973 | Blair | 360/60 |
| 4,109,114 | 8/1978 | Baer et al. | 360/72.1 |

Primary Examiner—Vincent P. Canney
Attorney, Agent, or Firm—Brown & Martin

[57] ABSTRACT

The disclosed apparatus includes a cylindrical shaped surface that synchronously rotates with a tape reel. Reflective material is patterned on this surface to form first, second and third tracks of bits running parallel to each other around the surface. A pair of light beams are aligned with the first and second tracks when a file protect reel is inserted in the tape reel, whereas the same pair of light beams are aligned with the second and third tracks when the tape reel does not have a file protect ring inserted therein. A light sensing circuit converts the portion of the light beams that is reflected from the aligned tracks into a pair of logic signals representative thereof. When the tape is moving in a predetermined direction, another circuit sets a bit in response to the logic signals as an indicator of which tracks are aligned with the light beams. Subsequently, the logic signals and the bit are used to indicate the amount of tape that is unwound from or wound onto the tape reel.

9 Claims, 4 Drawing Figures

FILE PROTECT AND AMOUNT OF TAPE SENSING APPARATUS

BACKGROUND OF THE INVENTION

This invention relates to magnetic tape drives, and more particularly to methods and apparatus for determining the presence of a file protect ring in a tape reel on the drive and also for determining the amount of tape that is contained on the tape reel. File protect rings are used to prohibit the erasing of information that was previously recorded on a tape. This is achieved by inserting the file protect ring in the reel that contains the tape that is to be protected. The tape drive on which that reel is subsequently mounted senses the presence of the file protect ring and in response thereto inhibits any write current in the write heads.

Other sensing apparatus are used in the tape drive to determine when the take-up reel is running out of tape. These sensors are included to enable a high speed rewind of the tape. During such a rewind operation, the tape is transported in a reverse direction at speeds which may be several times faster than the normal forward speed. Due to this high speed and the inertia of the tape reels, a relatively large time interval is required to stop the tape movement. This time interval is provided by sensing when the take-up reel is nearly empty and by initiating a tape stop sequence at that point.

In the prior art, separate sensors were provided for sensing the file protect ring and the amount of tape on the take-up reel. One of the sensors operated in conjunction with the supply reel for sensing the file protect ring; whereas the other sensor operated in conjunction with the take-up reel for sensing the amount of tape thereon. Typically, the take-up reel sensor included a light transmitter circuit and a light receiver circuit. The transmitter operated to emit a beam of light slightly above the take-up reel surface on which the tape was wound. For example, the beam of light might clear this surface by approximately ⅛ inch. Thus, when the amount of tape on the take-up reel was relatively large, the beam of light was blocked from passing over the surface; whereas when the amount of tape on the take-up reel was relatively small, the beam of light passed over the surface. The light receiver circuit was positioned to detect whether or not this beam of light was being blocked.

One problem with this prior art apparatus is that the alignment of the light beam with the take-up reel surface is highly critical. That is, if the light beam passes over the surface by too great a distance, then the rewind operation will slow down too soon; which in turn makes the operation of the drive slower. Conversely, if the light beam passes too closely to the take-up reel surface, then the rewind operation may result in the tape coming completely off of the take-up reel.

Still another problem with this prior art apparatus is that it is difficult to distinguish between when the light beam is actually being passed or blocked. As tape is unwound from the reel, the amount of light that passes increases in an analog fashion from no light to full light. And due to this continuous analog change in light intensity, the optimum point for initiating the end of the high speed rewind operation cannot be sensed.

Therefore, it is one object of the invention to provide a dual purpose sensor that operates in conjunction with only the supply reel for sensing both the file protect ring and the amount of tape on the take-up reel.

Another object of the invention is to provide a dual purpose file protect amount of tape sensor having improved accuracy.

Still another object of the invention is to provide a completely digital dual purpose file protect amount of tape sensor.

SUMMARY OF THE INVENTION

These and other objects are accomplished in accordance with the invention by a hollow cylindrical shaped body having an inside diameter surface and an outside diameter surface. The inside diameter surface slides over the shaft which connects to and turns the supply reel. On the outside diameter surface, there is reflective material that is patterned to form first, second and third tracks of bits running parallel to each other around the surface. First and second light emitting circuits overlie the outside diameter surface. They are spaced apart from each other by the distance between centers of the tracks. These circuits operate to transmit beams of light to respective ones of the tracks that are aligned thereunder.

When the file protect ring is in the reel, the first and second tracks align respectively with the first and second light emitting circuits. In comparison, when the file protect ring is not in the reel, the second and third tracks respectively align with the first and second light emitting circuits. A light receiving circuit is also included for converting the portion of the transmitted light beams that is reflected from the aligned tracks into a pair of logic signals that is representative of the reflected light. These signals are sent to a microprocessor. The microprocessor monitors the signals during a time interval in which the direction of the tape movement is known. Preferably, this is during a tape loading operation. In response to these signals, the microprocessor sets a bit as an indicator of whether the first and second tracks or the second and third tracks are aligned with the light emitting circuits. Subsequent to the setting of this bit, the microprocessor monitors the logic signals to determine the direction of movement of the tape reel. And based on the transitions of these logic signals, a counter is selectively incremented or decremented to indicate the amount of tape that is unwound from and wound onto the tape reel.

BRIEF DESCRIPTION OF THE DRAWINGS

The preferred specific embodiments of the invention that are disclosed herein will best be understood by reference to the following detailed description and the accompanying drawings wherein.

DETAILED DESCRIPTION

Figure 1:
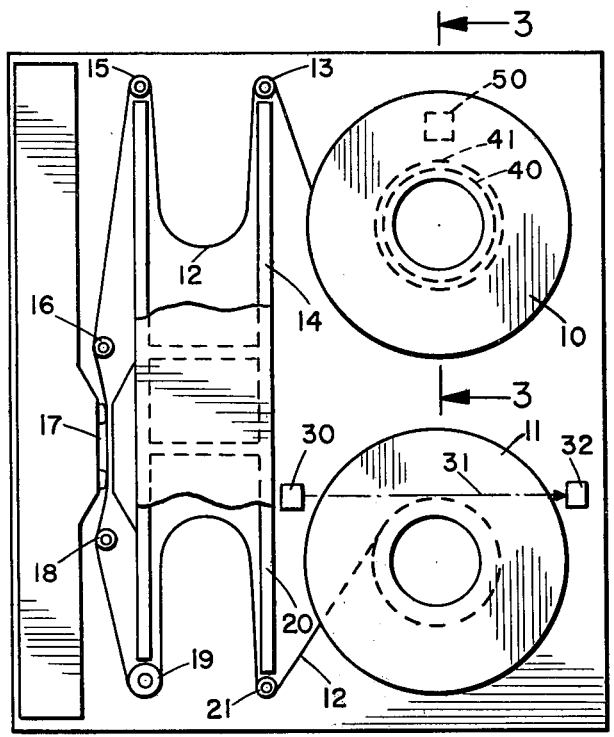
FIG. 1 is a front view of a tape drive constructed according to the invention.

Referring now to FIG. 1, there is illustrated the front view of a tape drive that is constructed according to the invention. The tape drive includes a supply reel 10 and a take-up reel 11. A magnetic tape 12 extends from reel 10 over a roller 13 into a vacuum column 14. From there, tape 12 passes over rollers 15 and 16 to a read/write head 17. Then, tape 12 extends over a roller 18 and a capstan 19 into another vacuum column 20. Finally, tape 12 passes over a roller 21 and onto reel 11.

Tape 12 is moved along the above described path in either a forward direction or a reverse direction. The forward direction of movement is from reel 10 to reel 11. Both the forward and reverse direction of movement occur in response to various commands that are sent to the drive. These commands may be sent in any sequence. Further, the time duration of each of the commands is a variable and is unpredictable. Thus, the amount of tape that is on each of the reels at any one particular time instant is also unpredictable.

In order for the tape drive of FIG. 1 to be able to perform a high speed rewind of the tape, means must be provided for sensing when reel 11 is nearly out of tape. The high speed rewind operation is performed by transporting tape 12 in a reverse direction at a speed that is substantially in excess of the forward tape transport speed. For example, a rewind speed of approximately 300 inches per second may be used with a corresponding forward transport speed of only 75 inches per second. Due to this high speed and the inertia of reels 10 and 11, it is necessary to sense when reel 11 is running out of tape, and then to slow down the rewind speed. Otherwise, the tape will run completely off reel 11 before it stops.

Prior art apparatus for sensing the amount of tape on reel 11 during this rewind operation is indicated in FIG. 1 via reference numerals 30, 31, and 32. As indicated, a light emitter 30 transmits a beam of light 31 to a light sensitive device 32. Emitter 30 and sensor 32 are positioned such that the beam of light 31 passes just slightly over the surface of reel 11 from which tape 12 is being unwound. Approximately ⅛ of an inch of spacing may occur between this surface and light beam 31, for example. This apparatus however, has the drawbacks that were pointed out in the Background portion of this disclosure.

Figure 2:
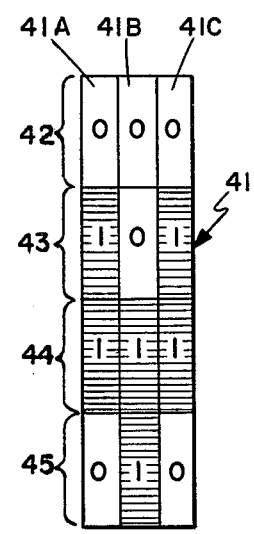
FIG. 2 illustrates a preferred pattern for the reflective material on a cylindrical shaped surface that comprises a portion of the FIG. 1 tape drive.

Components 30 and 32 are unnecessary and are excluded in the disclosed invention. Instead, there is included a cylindrical shaped surface 40 that lies behind reel 10. A reflective material 41 lies on this surface. It is patterned to form first, second and third tracks of bits running parallel to each other around surface 40. One preferred pattern for this reflective material is indicated in FIG. 2. There, reference numerals 41a, 41b, and 41c respectively indicate the first, second, and third tracks.

Each of these tracks is divided into four portions of equal length. These portions are indicated via reference numerals 42 through 45. Each portion represents one bit. The presence of reflective material in a particular portion makes that bit a logical one; whereas the absence of reflective material in a particular portion makes that bit a logical zero. Cross hatching is used in FIG. 2 to indicate the presence of reflective material. Thus, the FIG. 2 pattern represents a code of 000, 101, 111, and 010.

Figures 3, 4:
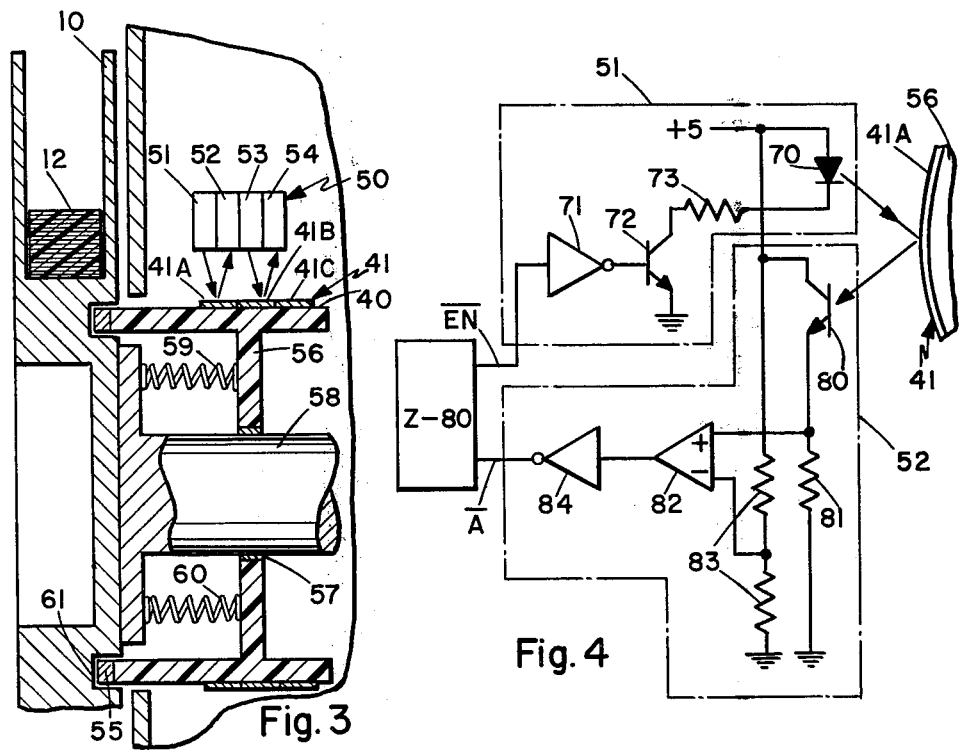
FIG. 3 is a cross-sectional view taken through a portion of the FIG. 1 tape drive.
FIG. 4 is a detailed circuit diagram of the electronic portion of the FIG. 1 tape drive.

Also included in the disclosed apparatus is a light emitting and light sensing circuit 50. The circuit lies above the patterned light reflective tracks 41a–41c. The basic modules of circuit 50, and their positions with respect to the light reflective tracks 41a–41c, is illustrated in FIG. 3. These modules include a first light emitting module 51 and a first light receiving module 52. Module 51 operates to transmit a beam of light to one of the tracks 41a–41b; and module 52 operates to convert the light that is reflected from that track to logic signals representative of the reflected light. Circuit 50 also includes a second light emitting module 53 and a second light receiving module 54. Module 53 transmitts a beam of light to one of the tracks 41b–41c; and module 54 operates to convert the light reflected from that track to logic signal representative thereof.

The actual tracks to which modules 51 and 53 transmit light depends upon whether or not a file protect ring 55 is inserted in reel 10. As FIG. 3 illustrates, when the file protect ring 55 is inserted, modules 51 and 53 respectively transmit light beams to tracks 41a and 41b. In comparison, when file protect ring 55 is not inserted in reel 10, modules 51 and 53 respectively transmit light beams to tracks 41b and 41c. That is, with the file protect ring 55 not inserted, surface 40 and tracks 41a–41c are re-aligned with respect to the light emitting modules.

As FIG. 3 illustrates, surface 40 is formed by the outside diameter surface of a hollow cylindrical body 56. This body has an inside diameter surface 57 which slides over a shaft 58. One end of this shaft connects to tape reel 10. The other end of shaft 58 connects to a reel motor for turning the tape reel. Also, a pair of springs 59 and 60 are included which connect body 56 to shaft 58. These springs provide a force that slides body 56 on shaft 58 until it comes in contact with either the file protect rings 55 or the surface of a slot 61 that holds the file protect ring. By making the spacing of the light beams that are transmitted by modules 51 and 53 equal to the width of file protect ring 55, and by making distance between centers of the tracks 41a–41c also equal to the width of file protect ring 55, the tracks selectively align with the light emitting modules as described above.

This selective alignment allows two functions to be performed. First, when tape 12 is initially being loaded onto reel 11, the direction of tape movement is predictably in the forward direction. And since the direction of tape movement is predictable, the logic signals that are generated in modules 52 and 54 as representations of the reflected light that they receive may be utilized to determine whether or not file protect ring 55 is in place. Specifically, a logic sequence of 00, 10, 11, 01, . . . indicates the presence of a file protect ring; whereas the logic sequence 00, 01, 11, 10, . . . indicates the absence of a file protect ring.

Subsequent to this initial tape load operation, various read commands, write commands, and move reverse commands will be sent to the drive. And while this is occurring, the disclosed apparatus provides a means for keeping track of the amount of tape that is on reel 11. This task is performed by selectively counting either up or down in response to the logic signals that are generated by modules 52 and 54 in combination with whether or not a file protect ring was previously sensed. Specifically, if a file protect ring was sensed, then each of the logic signal transistors of 00, to 10, 10 to 11, 11 to 01, and 01 to 00 indicate that the counter should be incremented. These same transitions indicate that the counter should be decremented if the file protect ring was not detected. Further, if the file protect ring was detected, then each of the transitions 00 to 01, 01 to 10, 11 to 10, and 10 to 00 indicate that the counter should be decremented. These same transitions indicate that the counter should be incremented if the file protect ring was not previously detected.

Next referring to FIG. 4, the details of a preferred implementation for modules 51 and 52 will be described. The other modules 53 and 54 are, of course, respectively identical to modules 51 and 52. As FIG. 4 illustrates, module 51 includes a light emitting diode 70. This diode is selectively enabled to transmit light in response to an enabling logic signal $\overline{EN}$. Signal $\overline{EN}$ is fed to the input of an inverting gate 71; which in turn drives a transistor 72. A low logic level for signal $\overline{EN}$ causes transistor 72 to turn on. And when transistor 72 is on, a conductive path exists from plus 5 volts through diode 70 through a resistor 73 and through transistor 72 to ground. Conversely, this conductive path is opened when transistors 72 is turned off. Thus, logic signal $\overline{EN}$ provides a means for selectively activating a light beam diode 70.

Circuit 52 includes a light sensitive transistor 80 for receiving light that is transmitted by diode 70 and is reflected by one of the tracks lying thereunder. In FIG. 4, the underlying track is illustrated as track 41a as an example. Transistor 80 has a collector connected to plus 5 volts and an emitter coupled to ground through a resistor 81. Thus, the voltage across resistor 81 is representative of whether or not reflected light is being received by transistor 80. This voltage is amplified by a differential amplifier 82. A reference voltage is applied to the inverting input of this amplifier. The reference voltage is generated by a plus 5 volts source through a voltage divider network 83. It establishes a noise level above which the voltage across resistor 81 must rise in order to be interpreted as the receipt of the reflected light. The output of amplifier 82 couples through an inverting gate 84 which operates to convert the amplifiers output to a logic signal $\overline{A}$.

Preferably, a microprocessor chip is used to generate signl $\overline{EN}$ and is used to receive signal $\overline{A}$. A Z-80 microprocessor may be used an an example. This and other microprocessors have the capability of monitoring signal $\overline{A}$ (and another signal similar to it from circuit 54) in order to determine whether or not a file protect ring is present in reel 10, and in order to increment and decrement a counter in response to the subsequent signal transitions. The counter is inside of the Z-80 microprocessor, Alternatively, of course, a special purpose logic combination of flip-flops and gates may be used to perform these functions.

A preferred embodiment of the invention has now been described in detail. In addition however, many changes and modifications may be made to these details without departing from the nature and spirit of the invention. For example, while the reflective strips are illustrated in FIG. 2 as being adjacent to each other, they alternatively may be spaced apart by uniform distance. Further, while the presence of a reflective strip was previously defined as a one bit, it alternatively may be defined as a zero bit with the absence of a reflective strip being defined as a one bit. Thus, since many modifications may be made, it is to be understood that the invention is not limited to the above described details, but is defined by the appended claims.

We claim:

1. Apparatus for sensing the presence or absence of a file protect ring on a tape reel, and for subsequently keeping track of the amount of tape contained on said reel comprising:

a cylindrical shaped surface that synchronously rotates with said tape reel;

reflective material on said surface patterned to form first, second, and third tracks of bits running parallel to each other around said surface;

first and second light emitting means spaced from each other by the distance between centers of said tracks and overlying said surface for transmitting light to receive ones of said tracks aligned thereunder;

means for aligning said first and second tracks respectively with said first and second light emitting means when said file protect ring is in said reel, and for aligning said second and third tracks respectively with said first and second light emitting means when said file protect ring is not in said reel;

means for converting the portion of said transmitted light that is reflected from said aligned tracks into a pair of logic signals representative thereof;

means for setting a bit, in response to said logic signals that are generated when said tape is moving in a predetermined direction, as an indicator of whether said light emitting means are aligned with said first and second tracks or said second and third tracks, and means for counting selectively up or down in response to both said logic signals and said bit to indicate the amount of tape that is unwound from or wound onto said tape reel subsequent to the setting of said bit.

2. Apparatus according to claim 1 and further including a shaft coupled to a motor for turning said tape reel, and wherein said cylindrical shaped surface is the outside diameter surface of a hollow cylindrical body having an inside diameter surface slid over said shaft.

3. Apparatus according to claim 1 wherein said tracks are adjacent to each other.

4. Apparatus according to claim 1 wherein said tracks are uniformly spaced apart from each other.

5. Apparatus according to claim 1 wherein said reflective material is patterned to form a code of 000, 101, 111, 010.

6. A method for sensing the presence or absence of a file protect ring on a tape reel, and for subsequently keeping track of the amount of tape contained on said reel comprised of the steps of;

rotating a cylindrical surface, having first, second and third tracks of patterned reflective material extending around said surface, in synchronism with said tape reel;

aligning said first and second tracks respectively with first and second light emitting means when said file protect ring is in said reel, and aligning said second and third tracks respectively with said first and second light emitting means when said file protect ring is not in said reel;

transmitting light from said first and second light emitting means respectively to said aligned tracks;

converting the portion of said transmitted light that is reflected from said aligned tracks into a pair of logic signals representative thereof;

setting a bit, in response to said logic signals that are generated when said tape is moving in a predetermined direction, as an indicator of whether said light emitting means are aligned with said first and second tracks or said second and third tracks; and counting selectively up or down in response to both said logic signals and said bit to indicate the amount of tape that is unwound from or wound onto said tape reel subsequent to the setting of said bit.

7. A method according to claim 6 wherein said tracks are adjacent to each other.

8. A method according to claim 6 wherein said tracks are uniformly spaced apart from each other.

9. A method according to claim 6 wherein said reflective material is patterned to form a code of 000, 101, 111, 010.

* * * * *